United States Patent
Drobe et al.

(10) Patent No.: US 7,997,726 B2
(45) Date of Patent: Aug. 16, 2011

(54) METHOD FOR DETERMINING A SET OF PROGRESSIVE MULTIFOCAL OPHTHALMIC LENSES

(75) Inventors: Bjorn Drobe, Singapore (SG); Claude Pedrono, Briis-Sous-Forges (FR)

(73) Assignee: Essilor International (Compagnie Générale d'Optique), Charenton Cedex (FR)

( * ) Notice: Subject to any disclaimer, the term of this patent is extended or adjusted under 35 U.S.C. 154(b) by 62 days.

(21) Appl. No.: 12/097,238

(22) PCT Filed: Dec. 12, 2006

(86) PCT No.: PCT/FR2006/002708
§ 371 (c)(1),
(2), (4) Date: Oct. 16, 2008

(87) PCT Pub. No.: WO2007/068819
PCT Pub. Date: Jun. 21, 2007

(65) Prior Publication Data
US 2009/0290121 A1    Nov. 26, 2009

(30) Foreign Application Priority Data
Dec. 13, 2005   (FR) ..................................... 05 12587

(51) Int. Cl.
*G02C 7/06* (2006.01)
(52) U.S. Cl. ......................... 351/168; 351/161; 351/177
(58) Field of Classification Search .................. 351/169, 351/177, 159, 161, 164, 168
See application file for complete search history.

(56) References Cited

U.S. PATENT DOCUMENTS

| 5,270,745 A | 12/1993 | Pedrono |
| 5,272,495 A | 12/1993 | Pedrono |
| 5,488,442 A | 1/1996 | Harsigny et al. |
| 6,318,859 B1 | 11/2001 | Baudart et al. |
| 6,382,789 B1 * | 5/2002 | Baudart et al. ................ 351/177 |
| 7,249,850 B2 | 7/2007 | Donetti et al. |
| 2003/0107707 A1 | 6/2003 | Fisher et al. |
| 2008/0106697 A1 | 5/2008 | Pedrono |

FOREIGN PATENT DOCUMENTS

| EP | 0 990 939 | 4/2000 |
| FR | 2 683 642 | 5/1993 |

(Continued)

OTHER PUBLICATIONS

Stefanie Schuldt, "ysis—Naturliches Sehen erleben", *Doz Optometrie & Fashion*, vol. 59, No. 5, pp. 38-43 (May 3, 2004).

*Primary Examiner* — Darryl J Collins
(74) *Attorney, Agent, or Firm* — HKH Law, LLC

(57) ABSTRACT

A method for determining by optimization a set of progressive ophthalmic lenses for a given user for whom a near vision power addition ($Add_n$) has been prescribed includes the following steps: measuring the user's near vision individual physiological parameters; determining an ergorama associating, on each lens, a target point in each look direction in worn conditions; determining a target power defect and a resulting target astigmatism for each direction of look under worn conditions, the target power defect and the resulting target astigmatism being determined from the user's measured physiological parameters; computing the power required for each lens for said ergorama by successive iterations to reach the target power defect and the target astigmatism for each look direction.

9 Claims, 7 Drawing Sheets

FOREIGN PATENT DOCUMENTS

| | | |
|---|---|---|
| FR | 2 683 643 | 5/1993 |
| FR | 2 699 294 | 6/1994 |
| FR | 2 704 327 | 10/1994 |
| FR | 2 753 805 | 3/1998 |
| FR | 2 858 693 | 2/2005 |
| FR | 2 874 709 | 3/2006 |
| GB | 2 277 997 | 11/1994 |
| WO | WO 98/12590 | 3/1998 |

* cited by examiner

METHOD FOR DETERMINING A SET OF PROGRESSIVE MULTIFOCAL OPHTHALMIC LENSES

CROSS-REFERENCE TO RELATED APPLICATIONS

This application is the National Stage of International Application No. PCT/FR2006/002708, filed on Dec. 12, 2006, which claims the priority to French Patent Applications Serial No. 05 12 587, filed on Dec. 13, 2005. The contents of all applications are hereby incorporated by reference in their entireties.

FIELD OF THE INVENTION

A subject of the present invention is a method for determining a set of progressive multifocal ophthalmic lenses; in particular a set of progressive lenses personalized for the specific needs of a given wearer.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and with the position of the wearer's eyes relative to the frame.

SUMMARY

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2-683 642, FR-A-2 699 294 or also FR-A-2 704 327.

Progressive multifocal ophthalmic lenses include a far-vision zone, a near-vision zone, an intermediate-vision zone, a principal progression meridian crossing these three zones. They are generally determined by optimization, based on a certain number of constraints imposed on the different characteristics of the lens. Most lenses marketed are all-purpose lenses, in that they are suitable for wearers' different day-to-day needs.

Families of progressive multifocal lenses are defined, each lens of a family being characterized by an addition which corresponds to the power variation between the far-vision zone and the near-vision zone. More precisely, the addition, referenced A, corresponds to the power variation between a point FV of the far-vision zone and a point NV of the near-vision zone, which are respectively called far-vision control point and near-vision control point, and which represent the points of intersection of the view with the surface of the lens for far distance vision and for reading vision.

In a standard fashion, a lens also has a fitting cross FC. This is a point marked on the surface of the lens and which is used by the optician when fitting the lens in the frame. The fitting cross FC corresponds to the point of intersection of the front face of the lens with the primary direction of view of the wearer. For a progressive ophthalmic lens, a progression length PL is also defined as the vertical distance between the fitting cross FC, and a point of the meridian on which the power progression reaches the power A. The progression length PL defines the accessibility to the necessary near-vision powers.

Lenses with the same addition differ by the value of the mean sphere at a reference point, also called a base. Generally, the base of a lens is linked to the curvature of a face of the lens and is given by the expression $(n-1)/R$ where n is the refractive index and R the radius of curvature expressed in meters, the mean power depends on the curvature of the other face of the lens. It is possible to choose for example to measure the base at the far-vision control point FV. Thus the choice of a pair (addition, base) defines a group or set of aspherical front faces for progressive multifocal lenses. Generally, it is thus possible to define 5 base values and 12 addition values, i.e. sixty front faces. In each of the bases an optimization is carried out for a given power. Starting from semi-finished lenses, of which only one face is formed, this known method makes it possible to prepare lenses suited to most wearers, by simple machining of a spherical or toric other face.

Thus, progressive multifocal lenses generally comprise a complex aspherical face, which can be the front face opposite to the wearer of the spectacles, and a spherical or toric face, which can be the rear face directed towards the wearer of the spectacles. This spherical or toric face allows the lens to be adapted to the user's ametropia, such that a progressive multifocal lens is generally defined only by its complex aspherical surface. As is well known, an aspherical surface is generally defined by the altitude of all of its points. The parameters constituted by the minimum and maximum curvatures at each point are also used, or more commonly their half-sum and their difference. This half-sum and this difference multiplied by a factor $n-1$, n being the refractive index of the lens material, are called mean sphere and cylinder. A progressive multifocal lens can thus be defined, at any point on its complex surface, by geometric characteristics comprising a mean sphere value and a cylinder value. The complex surface of the lens can be situated on the front face or on the rear face or distributed between the two faces, according to the machining techniques used.

Moreover, a progressive multifocal lens can also be defined by optical characteristics taking into account the situation of the wearer of the lenses. In fact, the laws of the optics of ray tracings mean that optical defects appear when the rays deviate from the central axis of any lens. Conventionally, the abnormalities known as wearer power defects and astigmatism defects are considered. These optical abnormalities can be generically called obliquity defects of rays.

Obliquity defects of rays have already been clearly identified in the prior art and improvements have been proposed. For example, the document WO-A-98 12590 describes a method for determination of a set of progressive multifocal ophthalmic lenses by optimization. This document proposes to define the set of lenses by considering the optical characteristics of the lenses and in particular the wearer power and oblique astigmatism, under wearing conditions. The lens is optimized by ray tracing, using an ergorama associating a target object point with each direction of view under wearing conditions.

EP-A-0 990 939 also proposes to determine a lens by optimization taking into account the optical characteristics instead of the surface characteristics of the lens. For this purpose the characteristics of an average wearer are considered, in particular with regard to the position of the lens in front of the wearer's eye in terms of curving contour, pantoscopic angle and lens-eye distance.

It has been found that each wearer has different lens-eye behaviour. Recently therefore it has been sought to personalize progressive ophthalmic lenses in order to best satisfy the needs of each wearer.

For example, for the definition of progressive lenses it is proposed, in particular by ZEISS and RODENSTOCK under the references Zeiss Individual and Impression ILT respectively, to take account of the actual position of the lens in front of the wearer's eye. For this purpose, measurements of the position of the lens in the frame chosen by the wearer are carried out. Firstly, measuring the position of the lens relative to the wearer's eye is difficult to carry out accurately. Then, optimization is carried out for a measured position of the lens in front of the wearer's eye; however, it turns out that the position of the frame varies over time and cannot be considered as constant for a given wearer. As a result of these two factors, allowance for the position of the lens does not appear to give the wearer additional comfort compared with solutions which consider only the mean position of the lens.

Under the trade mark VARILUX IPSEO, the applicant markets a range of progressive multifocal lenses, which are defined as a function of the wearer's head-eye behaviour. This definition is based on the fact that any wearer, to view different points at a given height in the object space, can move either his head or his eyes and that the viewing strategy of a wearer is based on a combination of head and eye movements. The wearer's viewing strategy influences the perceived width of the fields on the lens. Thus, the more the wearer's lateral vision strategy involves a movement of the head, the narrower is the zone of the lens scanned by the wearer's vision. If the wearer moved only his head in order to look at different points at a given height of the object space, his view would still pass through the same point of the lens. The product VARILUX IPSEO therefore proposes different lenses, for the same ametropia-addition pair, as a function of the wearer's lateral vision strategy.

With the same philosophy of personalizing progressive ophthalmic lenses to the specific needs of each wearer, the French patent application filed by the Applicants under the title "Method for determination of a pair of progressive ophthalmic lenses" on 27 Aug. 2004 under number 04 09 144 proposes to take account of the near-vision sagittal plane shift of the wearer for the determination of the optical characteristics of progressive lenses.

The company RUPP & HUBRACH has moreover proposed, under the reference Ysis, to measure the inclination of the head during a near-vision task in order to determine the choice between four proposed progression lengths. This measurement however does not fully take account of the head-eye behaviour, as it does not take account of the full lowering of view which can be defined as the sum of lowering the eyes in their sockets and inclining the head.

None of the progressive multifocal lenses known to date offers a full personalization of the pair of lenses prescribed to a given wearer. Measurements carried out in the Applicant's laboratories show that several physiological visual-motor coordination parameters affect the clear perception of object points in the environment of the wearer of progressive lenses. In addition to the conventional optometry and framing characteristics, five visual-motor coordination parameters—the horizontal and vertical participation of the head, the favoured lowering of view for a near-vision task, the favoured near-vision work distance and the near-vision lateral shift of the document—have been identified as affecting the optical characteristics of the lenses. These physiological parameters of visual-motor coordination vary substantially from one individual to another; they appear to be a response to seeking an optimal visual comfort depending on the physiological and visual characteristics specific to each individual.

Faced with the multiplicity of parameters to take into account in achieving a pair of lenses correctly personalized to the needs of a given wearer, most of the solutions of the prior art seek to favour one or other of these parameters and set the others to average standard values.

Therefore there is still a need for a lens which better satisfies the specific needs of each individual wearer.

The invention therefore proposes a method for determining by optimization of a set of progressive multifocal ophthalmic lenses from weighted targets for wearer power and resulting astigmatism; these targets being determined from the set of physiological parameters of the wearer and from a physiological-optometry model.

The physiological-optometry model used within the framework of the invention makes it possible to take account of all or some of the individual physiological parameters from the five identified previously and optionally to set the others to standard values by default. The wearer can thus maintain a more natural posture while retaining visual comfort.

More particularly, the invention proposes a method for the determination of a set of progressive ophthalmic lens by optimization for a given wearer for whom a near-vision power addition ($Add_n$) has been prescribed, comprising the steps of:

measuring individual physiological parameters of the wearer in near-vision;

determining an ergorama associating, on each lens, a point aimed at for each direction of view under wearing conditions;

determining a power defect target and a resulting astigmatism target for each direction of view under wearing conditions, the target power defect and the resulting astigmatism target being determined from the measured physiological parameters of the wearer;

calculating the power required on each lens for said ergorama by successive iterations to achieve the target power defect and the target astigmatism defect for each direction of view.

According to a feature, the power defect target is determined by the following relationship:

$$DefP = \frac{(ProbH') \cdot \left(\left(\frac{Add_n}{a}\right) - Add_r\right)}{kp}$$

With,

ProbH', the probability of occurrence of the orientation of view;

$Add_n$, the nominal prescribed addition for the wearer;

$Add_r$, the addition required at a point of the lens; and kp and a, constants determined as a function of the prescribed addition and the physiological parameters of the wearer.

According to a feature, the resulting astigmatism target is determined by the following relationship:

$$A = Ast_{MAX'}(ProbH')$$

With,

ProbH', the probability of occurrence of the orientation of view; and $$Ast_{MAX} = Add_n \times (k+b) \times \left(0.25 + e^{\frac{\left(ln\left(\frac{elev_{reg}-121}{-alpha0}\right)\right)^2}{sigma}}\right)$$

Where $Add_n$ is the prescribed nominal addition for the wearer; and k, b, alpha0 and sigma are constants determined as a function of the physiological parameters of the wearer.

According to embodiments, the measured physiological parameters of the wearer are at least the vertical and horizontal coefficients of participation of the head in near-vision, the vertical horopter in near-vision and the preferred near-vision distance Dnv.

The invention moreover proposes a set of progressive multifocal ophthalmic lenses personalized to the needs of a given wearer for whom a power addition has been prescribed, each lens being determined by means of an ergorama associating a point aimed at for each direction of view under wearing conditions, each lens having under wearing conditions, an optical power and a resulting astigmatism controlled for a point aimed at in the ergorama by physiological parameters of the wearer.

According to a feature, the optical power, on each lens under wearing conditions for a point aimed at in the ergorama, is determined by the following relationship:

$$DefP = \frac{(ProbH') \cdot \left(\left(\frac{Add_n}{a}\right) - Add_r\right)}{kp}$$

With,

ProbH', the probability of occurrence of the orientation of view;

$Add_n$ the nominal prescribed addition for the wearer;

$Add_r$, the addition required at a point of the lens; and kp and a, constants determined as a function of the prescribed addition and the physiological parameters of the wearer.

According to a feature, the resulting astigmatism, on each lens under wearing conditions for a point aimed at in the ergorama, is determined by the following relationship:

$$A = Ast_{MAX}(ProbH')$$

With,

ProbH', the probability of occurrence of the orientation of view; and $$Ast_{MAX} = Add_n \times (k+b) \times \left(0.25 + e^{\frac{\left(ln\left(\frac{elev_{reg}-121}{-alpha0}\right)\right)^2}{sigma}}\right)$$

Where $Add_n$ is the nominal prescribed addition for the wearer; and k, b, alpha0 and sigma are constants determined as a function of the physiological parameters of the wearer.

The invention also relates to a visual device comprising the set of lenses according to the invention and a personalized method for correcting the vision of a presbyopic subject, which comprises providing the subject with, or the wearing by the subject of, such a device.

BRIEF DESCRIPTION OF THE DRAWINGS

Other advantages and characteristics of the invention will become apparent on reading the following description of the embodiments of the invention, given by way of example and with reference to the drawings which show.

DETAILED DESCRIPTION

The invention proposes a method for determining a pair of progressive ophthalmic lenses for a presbyopic wearer, i.e. for whom a near-vision power addition A has been prescribed.

Figure 1:
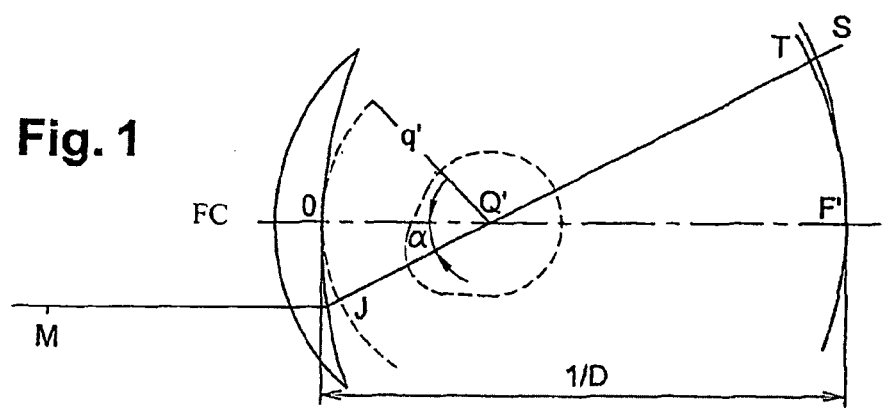
FIG. 1, a diagram of an eye-lens optical system, viewed from above.

Conventionally, characteristic optical variables are defined for a given lens, namely a wearer power and a resulting astigmatism, under wearing conditions. FIG. 1 shows a diagram of a side view of an eye and lens optical system, showing the definitions used in the remainder of the description. The centre of rotation of the eye is termed Q'; the axis Q'F' represented on the figure in dot-and-dash lines is the horizontal axis passing through the centre of rotation of the eye and extending in front of the wearer—in other words the axis Q'F' corresponds to the primary direction of view. This axis bisects a point on the front face of the lens called the Fitting Cross FC, which is marked oil the lenses to enable them to be positioned by an optician. The Fitting Cross makes it possible to mark the primary direction of view on the lens under wearing conditions. Namely, point O, the point of intersection of the rear face and this axis Q'F'. A sphere of the vertices, centre Q', and radius q', which bisects the rear face of the lens at point O, is defined. By way of example, a value of the radius q' of 27 mm corresponds to a standard value and gives satisfactory results during wearing of the lenses. It is possible to draw the cross section of the lens in the plane (O, x, y) defined with reference to FIG. 2. The tangent to this curve at point O is inclined with respect to the axis (O, y) by an angle termed the pantoscopic angle. The value of the pantoscopic angle is usually 8°. It is also possible to draw the cross section of the lens in the plane (O, x, z). The tangent to this curve at the point O is inclined with respect to the axis (O, z) of a angle called the curving contour angle. The value of the curving contour angle is usually 0°.

A given direction of view—represented by continuous lines in FIG. 1—corresponds to a position of the eye in rotation about Q' and to a point J on the sphere of the vertices;

a direction of view can also be marked, in spherical coordinates, by two angles α and β. The angle α is the angle formed between the axis Q'F' and the projection of the straight line Q'J over the horizontal plane containing the axis Q'F'; this angle appears in the diagram of FIG. 1. The angle β is the angle formed between the axis Q'F' and the projection of the straight line Q'J over the vertical plane containing the axis Q'F'. A given direction of view therefore corresponds to a point J of the sphere of the vertices or to a pair (α, β).

In a given direction of view, the image of a point M in the object space situated at a given object distance forms between two points S and T corresponding to minimum and maximum distances JS and JT (which are sagittal and tangential focal lengths in the case of revolution surfaces, and a point M at infinity). The angle γ; marked as the astigmatism axis is the angle formed by the image corresponding to the smallest distance with the axis $(z_m)$, in the plane $(z_m, y_m)$ defined with reference to FIGS. 2 and 3. The angle γ is measured in a counterclockwise direction when looking at the wearer. In the example of FIG. 1, on the axis Q'F', the image of a point of the object space at infinity forms at the point F'; the points S and T have merged, which is another way of saying that the lens is locally spherical in the primary direction of view. The distance D is the rear front end of the lens.

Figure 2:
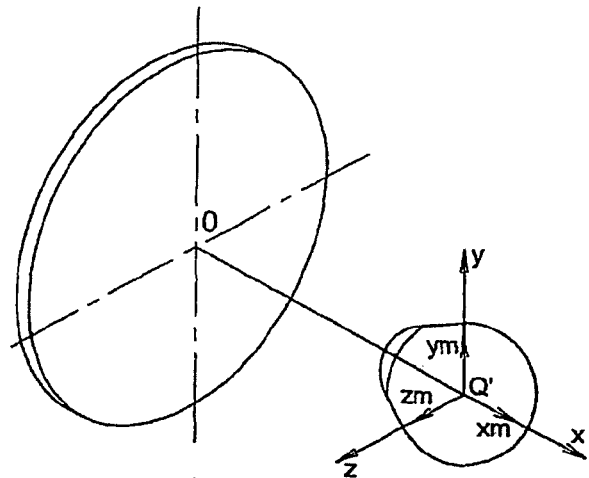
FIGS. 2 and 3, perspective diagrams of an eye-lens system.
Figure 3:
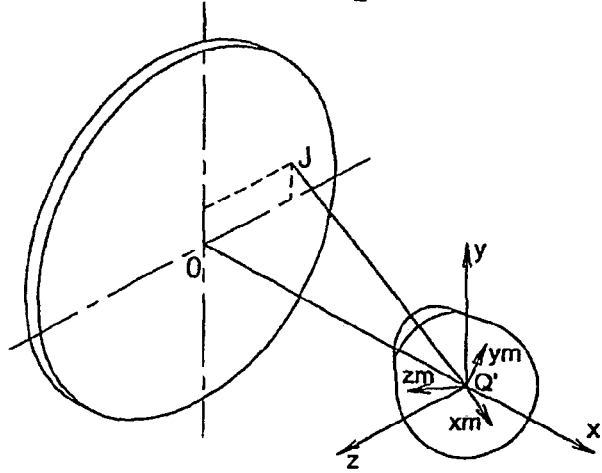

FIGS. 2 and 3 show perspective diagrams of an eye-lens system. FIG. 2 shows the position of the eye and of the reference point linked to the eye, in the principal direction of view, α=β=0, called the primary direction of view. The points J and O have thus merged. FIG. 3 shows the position of the eye and of the reference point which is linked to it in one direction (α, β). In FIGS. 2 and 3 a fixed reference {x, y, z} and a reference $\{x_m, y_m, z_m\}$ linked to the eye are represented, in order to show the rotation of the eye clearly. The origin of the reference {x, y, z} is the point Q'; the axis x is the axis Q'F'—the point F' is not represented in FIGS. 2 and 3 and passes through the point O; this axis is orientated from the lens towards the eye, in agreement with the direction of measurement of the axis of astigmatism. The plane {y, z} is the vertical plane; the y axis is vertical and orientated upwards; the z axis is horizontal, the reference being directly orthonormalized. The reference $\{x_m, y_m, z_m\}$ linked to the eye has the point Q' as its centre; the axis $x_m$ is given by the direction of view JQ', and coincides with the reference {x, y, z} for the primary direction of view. Listing's law gives the relationships between the references {x, y, z} and $\{x_m, y_m, z_m\}$, for each direction of view, see Legrand, *Optique Physiologique*, Volume 1, Edition de la Revue d'Optique, Paris 1965.

Using these elements a wearer optical power and an astigmatism can be defined, for each direction of view. For a direction of view (α, β), an object point M at a given object distance is considered. The points S and T between which the image of the object forms are determined. The image proximity IP is then given by:

$$IP = \frac{1}{2}\left(\frac{1}{JT} + \frac{1}{JS}\right)$$

while the objective proximity OP is given by $$OP = \frac{1}{MJ}$$

The power is defined as the sum of the object and image proximities, i.e.

$$P = OP + IP = \frac{1}{MJ} + \frac{1}{2}\left(\frac{1}{JT} + \frac{1}{JS}\right)$$

The amplitude of the astigmatism is given by $$A = \left|\frac{1}{JT} - \frac{1}{JS}\right|$$

The angle of the astigmatism is the angle γ defined above: it is the angle measured in a reference linked to the eye, with respect to the direction $z_m$, with which the image T forms, in the plane $(z_m, y_m)$. These power and astigmatism definitions are optical definitions, under wearing conditions and in a reference linked to the eye. Qualitatively, the thus-defined power and astigmatism correspond to the characteristics of a thin lens, which, fitted instead of the lens in the direction of view, provides the same images locally. It is noted that, in the primary direction of view, the definition provides the standard value of the astigmatism prescription. Such a prescription is produced by the ophthalmologist, in far vision, in the form of a pair formed by an axis value (in degrees) and an amplitude value (in diopters).

The thus-defined power and astigmatism can be experimentally measured on the lens using a frontofocometer; they can also be calculated by ray tracing under wearing conditions.

A method for determining an ergorama for a set of general-purpose progressive ophthalmic lenses is known from document WO-A-98 12590. The ergorama links each direction of view under wearing conditions, to a object point aimed at and a given power. This ergorama provides targets for an optimization of the lenses by ray tracing in order to calculate the wearer power and the resulting astigmatism at each point of the lens through which the line of vision passes.

The resulting astigmatism is a defect which is inherent to progressive lenses; it can therefore be considered to be a tolerable defect, at least in the peripheral zone of the lens.

The present invention proposes to take account of the physiological parameters of a given wearer, such as the horizontal and vertical participation of the head, the favoured lowering of view for a near-vision task, the favoured near-vision work distance and the near-vision lateral shift of the document, to design progressive lenses specific to each individual so that the latter can take full advantage of the correction of his presbyopia without effort in a natural posture and maintaining his visual comfort. The taking into account of such individual parameters is now possible on an industrial scale thanks to the methods for direct machining of the complex surfaces constituting the progressive lenses.

In particular, the invention proposes to use the physiological parameters of the wearer to limit to the maximum the resulting astigmatism in the fields of vision most used by this wearer. In fact, the less an orientation of view is used, the greater can be the tolerable astigmatism defect. A set of progressive ophthalmic lenses can thus be obtained having a resulting astigmatism defect controlled as a function of the frequency of the orientations of view through the lenses.

The Applicant has noted that each individual adopts a posture enabling maximum near-vision visual comfort. In particular, the individual adopts a posture making it possible to have an aiming distance close to a preferred value and inclines his document or changes the elevation of his eyes and head if the document is placed on a support, in such a way as to make it coincide with his vertical horopter. The vertical horopter for a given fixation point is defined here as the location of the vertical lines perceived in binocular vision as single and vertical.

Figure 4:
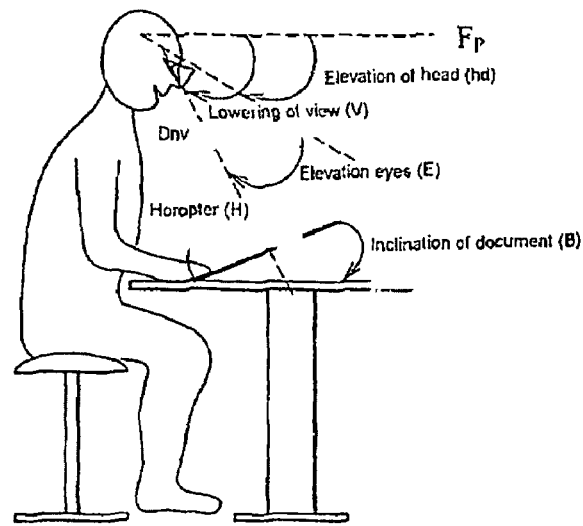
FIG. 4, a diagram of a subject in an environment requiring the use of near-vision.

FIG. 4 diagrammatically shows a wearer in a document-reading environment, i.e. in which the wearer makes use of near vision.

The Applicant's experimental observations have shown that in order to explore his environment an individual uses coordinated movements to move his head and eyes to a greater or lesser extent. The head movements are characterised within a reference linked to the space originating at the centre of rotation of the head. The eye movements are characterised within references linked to the head and originating at the centre of rotation of each of the two eyes. The direction of view $D_V$ is characterized with respect to a reference plane linked to the head and called the Frankfurt plane. A definition of the Frankfurt plane is given in patent applications FR-A-2 683 642 and FR-A-2 683 643; the Frankfurt plane $F_p$ is the plane passing through the lower border of the eye sockets and through the tragion of the ears of the wearer. The direction of view $D_V$ is a straight line belonging to a plane containing the point aimed at and the centres of rotation of the eyes.

In far vision, with a point aimed at straight in front in the far distance, the direction of view is horizontal. In the natural position, for this far-vision direction of view, the Frankfurt plane is horizontal; the amplitude of vertical movements of the eyes and head is therefore considered to be zero.

When the wearer abandons a far-vision target point to view a near-vision target point, he positions himself so that the mean distance from the document to his eyes is close to his preferred distance Dnv; and he inclines the document and/or lowers his eyes and head in respectively different proportions according to the individual so that the document forms an angle close to that of his vertical horopter with the direction of view.

In this context, the elevation of the head is defined as the angle Hd formed by the Frankfurt plane $F_p$ with a horizontal plane of the space and the elevation of the eyes—or ocular elevation—is defined as the angle E formed by the direction of view DV with the Frankfurt plane $F_p$. The elevation values of the eyes or the head are therefore downward movements and are expressed with negative angle values. The lowering of view V is therefore carried out by an elevation of the head Hd and by an elevation of the eyes. More specifically V=Hd+E. The lowering of view V is therefore the angle formed between the horizontal plane of the space and the direction of view $D_V$.

Close to the fixation point, the vertical horopter can be equivalent to a plane section more or less inclined at an angle H with respect to the direction of view $D_V$. Due to muscular balance, the lowering of the eyes in near vision, combined with convergence, results in a twisting of the eyeballs which changes the vertical and horizontal references of the visual system. The vertical horopter H therefore varies with the elevation of the eyes E. The vertical horopter H, for a given subject, varies with the target distance. In this regard, reference can be made to the manual "Vergence eye movements: Basic & clinical aspects", by Clifton M. Schor and Kenneth J. Ciuffreda, p 557, published in 1983.

The vertical horopter is a variable which varies from one individual to another as a function of morphological, physiological and behavioural parameters; on the other hand for a given distance, the vertical horopter is approximately constant for a given individual. Thus, each individual will position and/or incline his document at an angle B so that the document forms an angle close to his vertical horopter with the direction of view $D_V$. Similarly, the preferred near-vision distance of viewing Dnv varies from one individual to another but remains substantially constant for a given individual. Hereinafter, it will be assumed that the document is placed flat on a horizontal support, i.e. that the angle B is zero. The vertical horopter H and the near-vision direction of view will therefore have the same angular value.

Most progressive ophthalmic lenses on the market are known as general-purpose and are calculated to satisfy the needs of the majority. The method of the invention proposes to measure the near-vision posture of each wearer by appropriate means. In particular, the method proposes to limit to the maximum the resulting astigmatism in the fields of vision most used by the wearer. The personalization parameters thus make it possible not only to supply a set of progressive ophthalmic lenses having a progression length specifically adapted to the wearer, but also to supply a set of progressive ophthalmic lenses having a resulting astigmatism defect controlled as a function of the frequency of the orientations of view through the lenses.

Firstly, a physiological-optometry model is produced, the input variables of which are the physiological parameters of the wearer. This model thus supplies the target values for the optimization of the complex surfaces of each lens of the personalized set of lenses as a function of the distribution of the orientations of view of the wearer.

Figure 5:
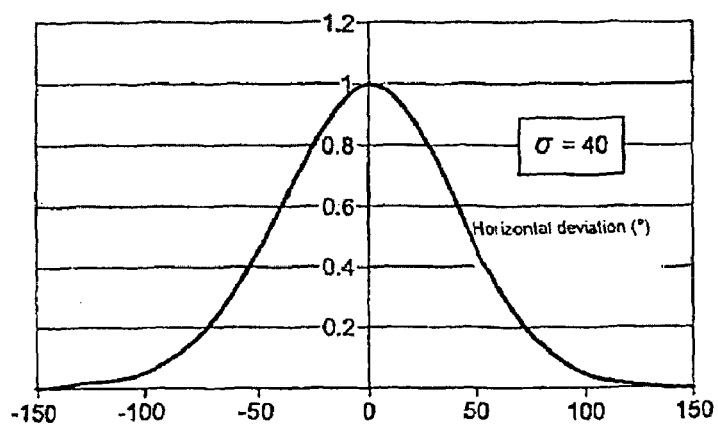
FIG. 5, a graph of the horizontal distribution of view for a given lowering of view.

FIG. 5 is a graph showing the distribution of the horizontal orientations of view. It can be assumed that the frequencies of the horizontal orientation of view follow a Gaussian distribution between the natural limits fixed by the maximum ranges of the eye and head movements, i.e. between −150° and +150°. This distribution is expressed as follows:

$$GaussH = e^{\frac{1}{2}(\frac{\alpha}{\sigma})^2}$$

With α, the horizontal deviation of view in degrees and σ the standard deviation of the Gaussian distribution.

The higher this orientation frequency is, the greater the probability of having such an orientation. The maximum probability is obtained for the maximum frequency. It is possible to standardize this probability of occurrence by setting this maximum probability to 1. FIG. 5 shows that the highest horizontal orientation of view corresponds to a view straight ahead and the horizontal deviation of view reduces with the lowering of view.

Figure 6:
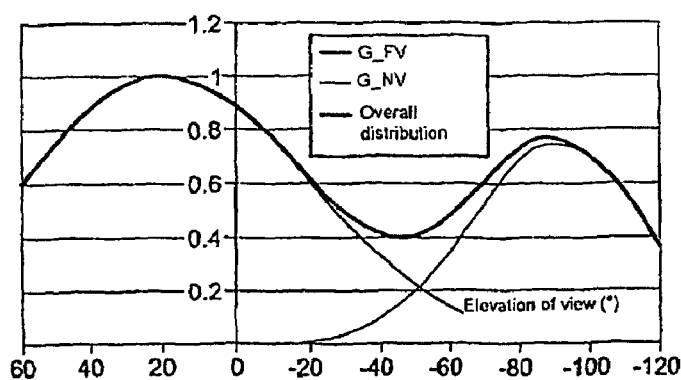
FIG. 6, a graph of the vertical distribution of view for a zero horizontal deviation.

FIG. 6 is a graph showing the distribution of the vertical orientations of view. The frequency of vertical scanning can be represented by the envelope of at least two Gaussian distributions; one for far vision G_FV and one for near vision G_NV. FIG. 6 gives an example of the distribution of the lowerings of view with a zero horizontal deviation. The maximum for the near-vision Gaussian distribution is centred on the preferred near-vision lowering of view specific to each subject. The maximum for the far-vision Gaussian distribution is centred close to the direction straight in front. It can be assumed that far vision is generally more used than near vision. A coefficient can therefore modulate the Gaussian distribution of the near-vision distribution; in the example of FIG. 6, this coefficient is set at 0.75, i.e. that the relative probability of a lowering of view on the near-vision vertical horopter is less than the relative probability of a view straight ahead.

The resulting tolerable power and astigmatism defect at a given point will thus be a function of the horizontal distribution value and the standard deviation of the Gaussian distribution of the horizontal orientation of view as shown in FIG.

5. The astigmatism defect is set to a zero value when GaussH is equal to 1 and can reach a maximum value when GaussH is zero.

The ideal lens would have no astigmatism defect. It is therefore necessary to set a tolerable defect for each point of a lens.

The above model provides for each orientation of view, a probability of occurrence of this orientation (ProbH=1−GaussH) having a value comprised between 0 and 1 inclusive. The value 0 characterizing the maximum probability and the value 1 an orientation which is virtually never used. For this rarely- or never-used orientation, the wearer will tolerate a maximum defect that is set as a function of the addition.

For the orientation having the maximum probability of occurrence, no defect is tolerated. The model sets this maximum probability on the sagittal plane, therefore on the meridian.

The resulting astigmatism can then be expressed as follows:

$$A = A_{MAX} \cdot (1 - \text{Gauss}H) = ka \cdot \text{Add}_n \cdot (\text{prob}H) \quad (2)$$

where $A_{MAX}$ is the maximum tolerable defect which is equal to ka times the nominal addition ($\text{Add}_n$), i.e. the prescribed addition for the wearer, with ka a constant linked to the prescribed addition; and ProbH=1−GaussH.

Moreover, the wearer power can be expressed as follows $$P = WPOr + \frac{(probH) \cdot \left( \left( \frac{Add_n}{a} \right) - Add_r \right)}{kp} \quad (3)$$

Where

P is the final wearer power;

WPOr, the gross wearer power required, calculated in the ergorama;

$\text{Add}_n$ the nominal addition—i.e. the prescribed addition for the wearer;

$\text{Add}_r$ the addition required which is equal to the wearer power required WPOr minus the far-vision power prescribed; and kp and a, coefficients setting the maximum power defect.

Such an equation makes it possible to ensure a zero power defect along the meridian and along a wearer iso-addition line corresponding to half of the nominal addition ($\text{Add}_n/2$) when the coefficient a is set at 2.

For example, in this base model, constants a and kp are set at 2 so that the maximum power defect P is 0.5 diopter for a nominal addition $\text{Add}_n$ of 2 diopters and is zero when $\text{Add}_r$ is equal to $\text{Add}_n/2$.

Figure 7A:
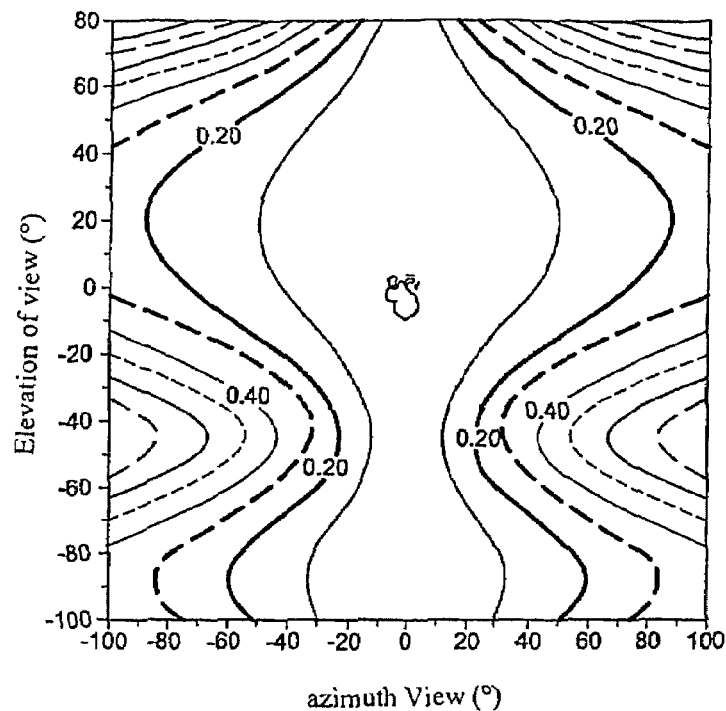
FIG. 7*a*, an example of the distribution in the field of vision of the relative probabilities of not having an orientation of view.
Figure 7B:
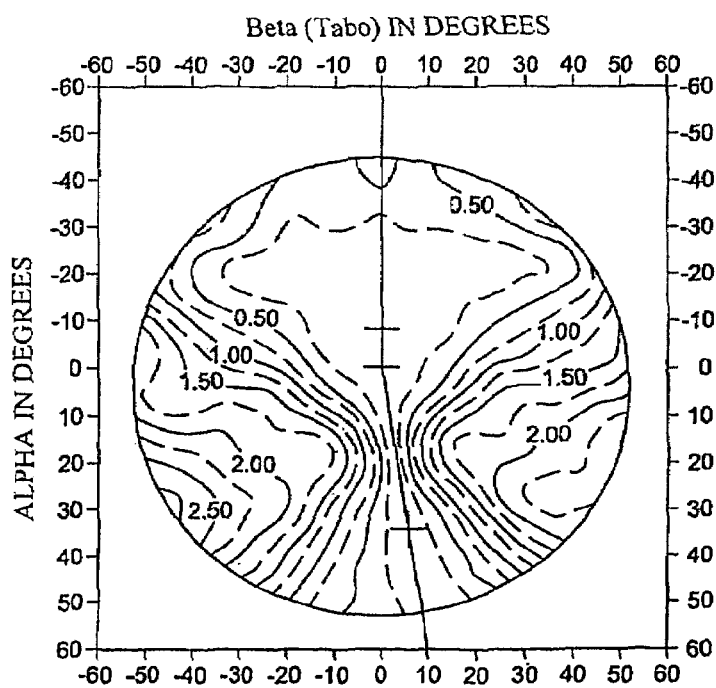
FIG. 7*b*, the resulting astigmatism defect for the distribution of FIG. 7*a*, calculated with equation (2) of the physiological-optometry model.

FIGS. 7a and 7b show, for the right eye of a standard subject, respectively the distribution in the wearer's field of vision of the relative probabilities of not having the orientation of view (ProbH=1−GaussH) and the resulting astigmatism defect calculated by optical optimization with equation (2) of the model.

FIG. 7b shows that the application of equation (2) in the optical optimization calculation method does not correspond to achievable targets for progressive multifocal lenses. In fact, in FIG. 7a, the fields come too close together at the top and bottom of the lens for it to be possible to overcome the distributions of the defects on the surface in the far-vision zone and in the near-vision zone. Moreover, for this standard wearer, the small distance between the maxima of the vertical distributions of the lowering (or elevation) of view causes the disappearance of the trough between the far-vision and near-vision isoastigmatism curves on the overall distribution. This disappearance of the trough is incompatible with the optimization of progressive lenses where the width between the isoastigmatism lines is essentially controlled by the rate of variation of the power along the meridian.

It is noted that in equations (2) and (3) of the model, the variable ProbH controls the power defect and astigmatism defect distributions. Now, for progressive lenses, these two values must be treated separately.

For the calculation of progressive lenses, the lowering of the eyes (or ocular elevation) is taken into account rather than the lowering of view. Equation (1) of the Guassian distribution of view GaussH and the probability of occurrence of this orientation ProbH, which are physiological hypotheses, must be modified.

A new equation is defined for the probability of occurrence of the orientation of view, as follows:

$$ProbH' = 1 - e^{\frac{1}{2}\left(\frac{|\alpha|^z}{\sigma h}\right)^2} \quad (4)$$

With,

α the horizontal deviation of view in degrees for a given lowering;

z, a shaping factor comprised between 0.5 and 1 which depends on the physiological parameters of the wearer; and σh, a biphasic function of the vertical distribution of the ocular orientation and which is expressed as follows:

$$\sigma h = ShMax \times Distrib \times \left( \frac{Amax_{FV}}{1 + 10^{((X0_{fv} - Elev_{oc})Hfv)}} + \frac{Amax_{NV}}{1 + 10^{((Elev_{oc} - X0_{nv})Hnv)}} \right) \quad (5)$$

Where

Distrib is a constant which depends on the prescribed nominal addition;

ShMax is a constant which depends on the prescribed addition and on the visual-motor behaviour of the wearer;

$Amax_{FV}$ and $Amax_{NV}$, the far-vision and near-vision upper asymptotes of σh respectively;

$H_{FV}$ and $H_{NV}$, the slopes of the variation of σh respectively when towards far vision and towards near vision;

$Elev_{OC}$, the vertical ocular elevation; and $X0_{VL}$ and $X0_{VP}$, the ocular elevation for which half of $Amax_{FV}$ and $Amax_{NV}$ is respectively achieved on σh.

Figure 8:
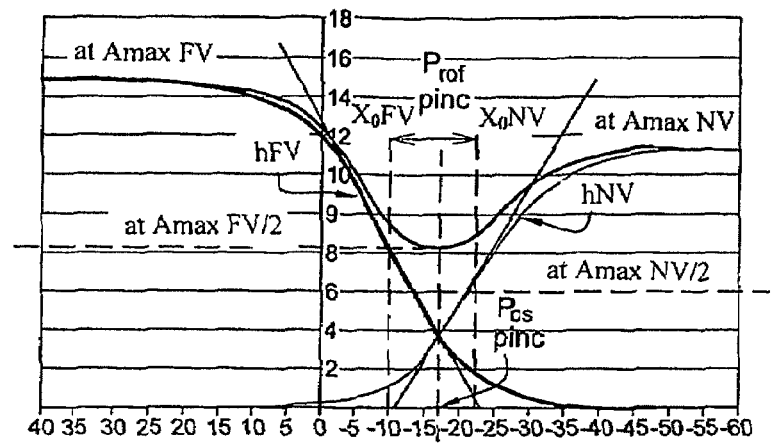
FIG. 8, a graph of the standard deviations in the sagittal plane.

FIG. 8 shows the distribution of the vertical ocular orientations for a zero horizontal deviation. FIG. 8 is a graphical representation of equation (5) of σh with $Elev_{OC}$ on the x-axis. The graph of FIG. 8 therefore represents the standard deviations of orientation of the eyes in the sagittal plane.

From the graph of FIG. 8, the variables $X0_{NV}$ and $X0_{FV}$ can be linked by two other parameters:

Pospinc, which sets the position of the minimum of a vertical orientation of view on the lens; and Profpinc, which represents the depth of this minimum and which corresponds to the difference between $X0_{FV}$ and $X0_{NV}$.

The relationships below follow from this:

$X0_{NV}$=Pospinc−(Profpinc/2); and $X0_{FV}$=Pospinc+(Profpinc/2) \quad (6)

The power defect for a progressive lens can then be expressed as follows:

$$DefP = \frac{(ProbH') \cdot \left(\left(\frac{Add_n}{a}\right) - Add_r\right)}{kp} \quad (7)$$

With,

ProbH' as defined in equation (4);

$Add_n$ the nominal addition—i.e. the prescribed addition for the wearer;

$Add_r$ the addition required which is equal to the wearer power required WPOr minus the far-vision power prescribed; and kp and a, coefficients setting the maximum power defect.

Moreover, the resulting astigmatism for a progressive lens is determined by the following relationship:

$$A = Ast_{MAX}(ProbH') \quad (8)$$

In this new equation (8) of the resulting astigmatism, the specificity of the progressive lenses is taken into account by varying the maximum astigmatism value ($Ast_{MAX}$) as a function of the elevation of view in order to better control tolerable astigmatism values in the near-vision and far-vision zones.

The maximum tolerable astigmatism value is expressed as follows:

$$Ast_{MAX} = Add_n \times (k+b) \times \left(0.25 + e^{\left(\ln\left(\frac{elev_{reg}-121}{-alpha0}\right)\right)^2 / sigma}\right) \quad (9)$$

This equation (9) of the maximum tolerable astigmatism on the lens depends not only on the nominal addition $Add_n$ but also on the elevation of view. The resulting maximum astigmatism value is therefore reached on the part of the lens in the region of the narrowing defined on FIG. 8.

Figure 9:
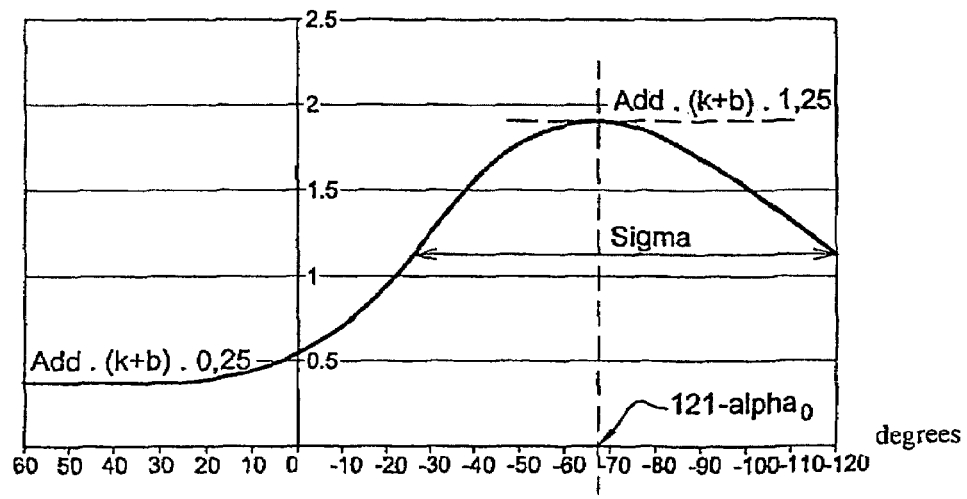
FIG. 9, a graphical representation of the maximum astigmatism defect accepted for a set of lenses according to the invention as a function of the elevation of view.

FIG. 9 gives a graphic representation of $Ast_{MAX}$ as a function of the elevation of view. The factor (k+b) sets the maximum value of the astigmatism as a function of the addition for an elevation of view minus 121°. This maximum astigmatism value is set at $Add_n*(k+b)*1.25$ and the minimum value is $Add_n*(k+b)*0.25$. The value of 121° is chosen to enable validity of the expression in the whole field of vision (120° upwards).

The resulting power and astigmatism defect equations (7) and (8) above make it possible to calculate the design of a progressive lens by optimization.

A set of progressive lenses personalized to the needs of a wearer can be calculated with the above equations by introducing the physiological parameters of the wearer into the calculation of the ergorama and by varying certain factors of said equations as a function of the wearer parameters in order to strive towards realizable design solutions.

The method according to the invention therefore proposes to measure the wearer's near-vision vertical horopter H, i.e. the angle formed by the direction of view with the document containing the point aimed at, as well as the lowering of view and the elevation of the head in near vision, and to determine a near-vision vertical coefficient of participation Ptv of the head in order to determine a progression length PL specifically suited to the needs of this wearer. The vertical coefficient of participation of the head is defined as the ratio of the elevation of the head to the lowering of view Ptv=Hd/V. The method also proposes to determine the wearer's preferred near-vision distance Dnv, as well as the roll of the head and the horizontal coefficient of participation of the head Pth. The horizontal coefficient of participation of the head is defined as the ratio of the orientation of the head in the horizontal plane to the orientation of view in this same plane.

The measurements for implementing the method according to the invention can be carried out as follows.

The environment chosen is a desk environment as represented in FIG. 4. The wearer is positioned at a work table, with a document flat on the table (B=0). The wearer is positioned such that to aim at the centre of the document he lowers his eyes and his head so that the angle made by the document with the line of view $D_V$ is equal to the near-vision vertical horopter H and the document is at a preferred near-vision distance Dnv from his eyes. This positioning makes it possible to locate the centre of rotation of the head in the environment. This point is then considered fixed. In order to describe the view environment, the head of the wearer will turn about this point, the eyes will turn in the head. The position of the ocular centres of rotation with respect to the centre of rotation of the head is known, the lowering of the eyes which is the complement for the near-vision vertical horopter is deduced therefrom.

For each point aimed at in the environment, the proximity object of this point is known and the necessary lowering of view and elevation of the head are measured. From this, the vertical coefficient of participation of the head can be deduced. It is possible to calculate at each point of the lens, the power required for the wearer to perceive this point clearly. Under the near-vision conditions of use, knowledge of the power of the lenses required is given by the subject's near-vision prescription NV, and from the measured distance Dnv it is possible to determine the amount of subjective accommodation employed by the subject. In fact the accommodation is deducted using the following formula:

Wearer power=object proximity−accommodation.

The ergorama makes it possible to link this accommodation to the convergence necessary to merge the near-vision point with both eyes, taking account of the prismatic effects of the lenses. The ergorama defines the ratio of the accommodation over the convergence.

Once the subject is positioned in his environment, he visually scans the latter, according to a predetermined square angular grid, by coordinated eye and head movements within so-called physiological references (elevation, azimuth). This coordination of movements conforms to the horizontal and vertical coefficients of participation of the head characterizing the subject. The power required and the position of the impact points on the lenses are calculated (taking into account the prismatic effects due to this power) from the accommodation/convergence combination characterizing the subject, with knowledge of the position of each node of the grid in relation to the centre of rotation of the head. Such a calculation is performed by nested iterations, i.e. an iterative loop following the horizontal for each stage of the iterative loop following the vertical. These iterations are used for merging the two eyes on the tracked point in space, by seeking to cancel out the pointing error for each eye by small successive modifications of the position of eyes—accommodation pair.

The present invention therefore proposes to measure the near-vision posture by a suitable device, making it possible, among others, to measure the preferred near-vision distance, the near-vision lowering of view and at least the preferred elevation of the head or the preferred elevation of the eyes in near-vision. Such a device can comprise a sensor placed on the head of the wearer and an element making it possible to locate the point aimed at, such as a sensor placed on a pointer pen or any device making it possible to measure the rotation of the eyes in their reference.

These personalization parameters are then used to define the different variables of the equations for power defect (7) and resulting astigmatism (8) used in the iterative calculation of the power required on the lens.

In an example of possible implementation, the power defect target can be determined from equation (7) as follows:

$$DefP = ProbH' * 0.75 * \left(\frac{Addn}{3} - Addr\right)$$

And the resulting astigmatism target can be determined by equation (8) as follows:

$$A = Ast_{MAX}(ProbH')$$

With ProbH' as defined in equation (4), oh as defined in equations (5) and (6), and $Ast_{MAX}$ as defined in equation (9).

According to this example of implementation, the constants of the different relationships above are determined from the physiological parameters of the wearer.

In particular:

Distrib=$2/\sqrt{add}$ $PL = H \times (1-Ptv)$ $ShMax = (((Add_n \times 12)-4) \times Pth)+14$ $z = (0.25\ Pth)+0.625$ $Pospinc = (1.5\ Add_n)-(0.4\ LP)-5$ $Profpinc = ((LP-22.5) \times 0.35 \times Pth)+10.2$ $Amax_{FV} = (-0.25Pth)+0.575$ $Amax_{NV} = (-0.25Pth)+(0.005Add_n)+0.475$ $H_{FV} = (-0.0035LP)-(0.05Pth)+0.215$ $H_{NV} = (-0.05Pth)+0.105$ And $k = ((0.03 \cdot LP-1.075) \times Pth)+(1.717-0.027 \cdot LP)+((90-H) \times 0.05/32.5)$ $b = 0.5-Pth$ $alpha0 = 25 \cdot Pth+(-5 \cdot Add_n)+H/2+0.7 \cdot LP+((40-LP) \cdot (Pth-0.3) \cdot ((90-H)/32.5))+119.8$ $Sigma = (0.05 \cdot Pth)+((0.000714 \cdot H) \cdot (1+(LP-25)/62.5)-0.005$ The personal physiological parameters of the wearer, namely his vertical Ptv and horizontal Pth near-vision coefficients of participation of the head, as well as his near-vision vertical horopter H and his preferred near-vision distance Dnv are taken into account in the calculation of the target values for the power defect and resulting astigmatism for determining a set of lenses specifically suited to this wearer. These personalization values are added to the values for curving contour angle, pantoscopic angle, interpupillary distance, lens-eye distance and pupil length and height for each eye. All these parameters inform the calculation program by optical optimization in order to calculate the pair of lenses by successive iterations.

At each iterative loop of the calculation of the power required at a point of the lens, the tolerated power defect is introduced into the calculation of the prismatic deviations, therefore into the calculation of the accommodation and the convergence.

The tolerated astigmatism defect is calculated for each node of the grid once the horizontal and vertical iterations have converged on the zero pointing error of equation (9) of the model which depends on the characteristics of the wearer.

A weighting dependant on the position of the point of impact on the lens is attributed to the calculated power. A weighting, dependant on the position of the point of impact on the lens and on the ProbH' value given by equation (4) and on the characteristics of the wearer, is attributed to the tolerable astigmatism defect which becomes the resulting astigmatism. The weightings along the meridian and in larger or smaller zones around the FV and NV control points are set at values markedly greater to the others. For example, a weighting comprised between 15 and 10 is attributed to the wearer power on the meridian and to the points NV and FV while all the other weightings are set at 1; and a weighting comprised between 12 and 8 is attributed to the astigmatism on the meridian and to points NV and FV while the other weightings are given by the expression ProbH'+1.5.

A file of the weighted wearer power targets and resulting astigmatism targets is then created under a format suitable for it to be read by the optimization program. A manufacturing order is then produced for controlling a direct manufacturing machine.

The lenses thus manufactured will make it possible to conform to the natural posture of the wearer, thus offering him a greater visual and postural comfort.

FIGS. 10a to 10f represent meridian profiles for six examples of lenses obtained according to the method of the invention. FIGS. 11a to 11f and 12a to 12f represent the optical characteristics of the lenses of FIGS. 10a to 10d; i.e. wearer power maps for the series of FIG. 11 and resulting astigmatism maps for the series of FIG. 12.

The table below summarizes the physiological characteristics of the six examples of wearers for which a pair of lenses was determined by optimization. This table indicates, for each wearer, the personalized progression length PL=H(1−Ptv) in degrees; the near-vision vertical horopter H in degrees, the near-vision vertical coefficient of participation of the head Ptv=Hd/V and the near-vision horizontal coefficient of participation of the head.

|     | Wearer |  |  |  |  |  |
| --- | --- | --- | --- | --- | --- | --- |
|     | A | B | C | D | E | F |
| PL  | 40 | 40 | 32.5 | 32.5 | 25 | 25 |
| H   | 90 | 55 | 90 | 55 | 90 | 90 |
| Ptv | 0.556 | 0.273 | 0.639 | 0.409 | 0.722 | 0.722 |
| Pth | 0.5 | 0.5 | 0.3 | 0.7 | 0.3 | 0.7 |

The series of FIGS. 10, 11 and 12 show a lens of diameter 45 mm with a progressive multifocal front face and comprising a prism with a geometric base orientated at 270° in the TABO reference. The prism is 1.66° for wearer A, 1.70° for the wearers B and D, 1.71° for wearers C and E and 1.61° for wearer F. The plane of the lens is inclined to the vertical by 8° and the lens has a thickness at the centre of 1.8 mm. A value for q' of 27 mm (as defined with reference to FIG. 1) was considered for the measurements on the lenses of wearers A to F.

In the series of FIGS. 11 and 12, the lens is represented at a reference point in spherical coordinates, the beta angle being plotted on the x-axis and the alpha angle on the y-axis.

Figure 10A:
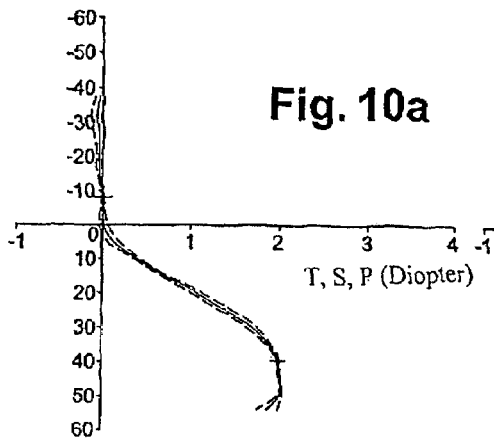
FIGS. 10*a* to 10*f*, profiles of meridians for examples of lenses obtained by optimization with the method according to the invention.
Figure 10B:
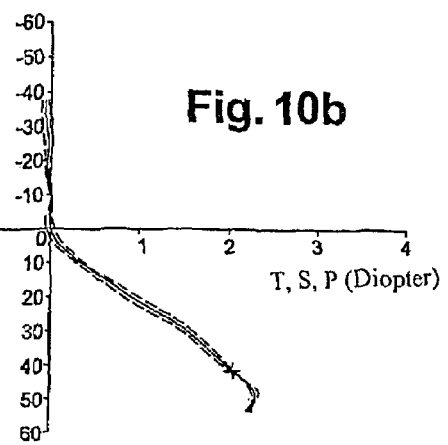
Figure 10C:
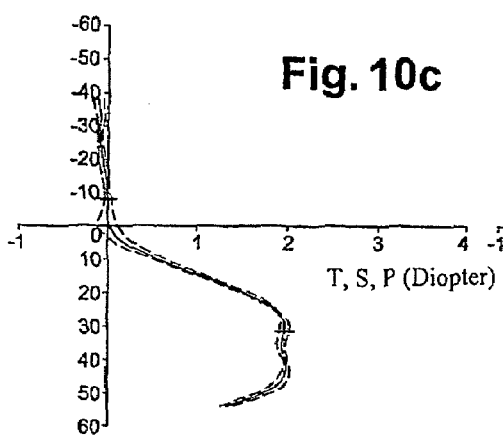
Figure 10D:
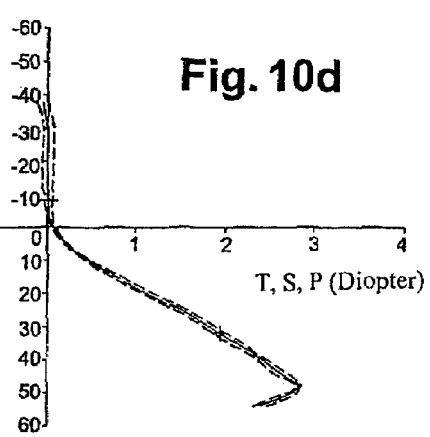
Figure 10E:
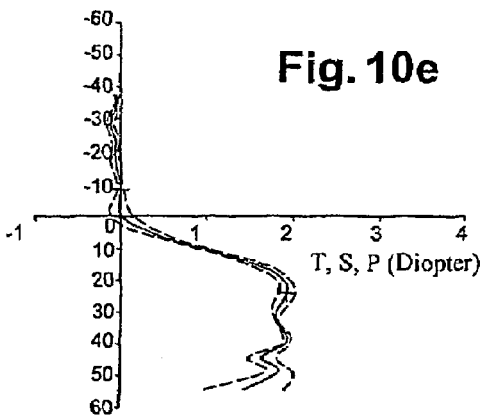
Figure 10F:
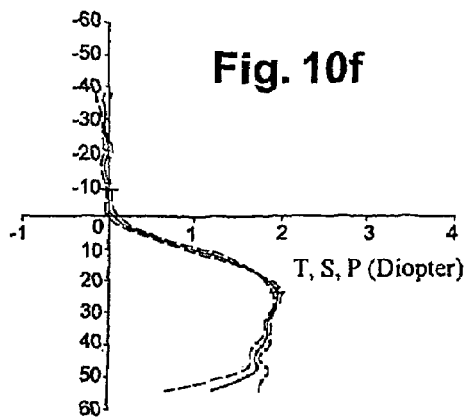
Figure 11A:
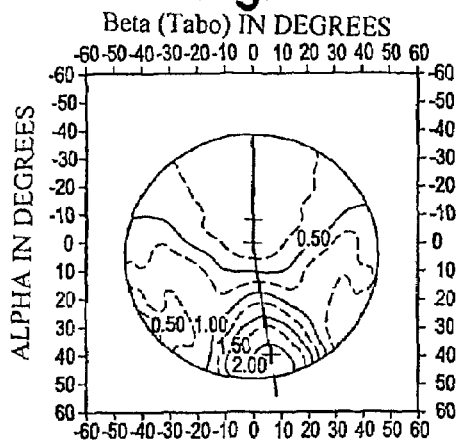
FIGS. 11*a* to 11*f*, wearer power maps for the lenses of FIGS. 10*a* to 10*f*.
Figure 11B:
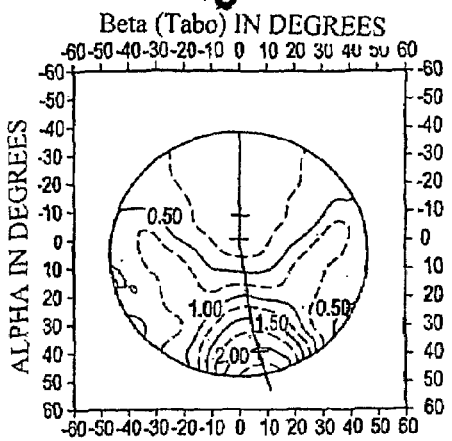
Figure 11C:
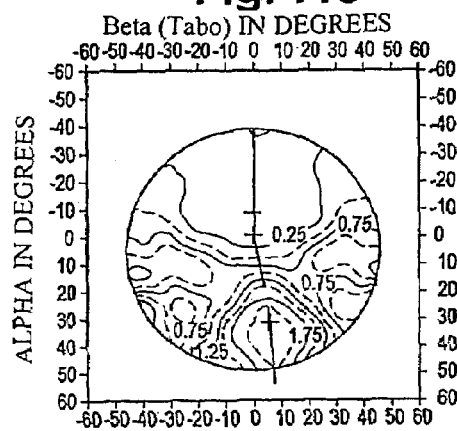
Figure 11D:
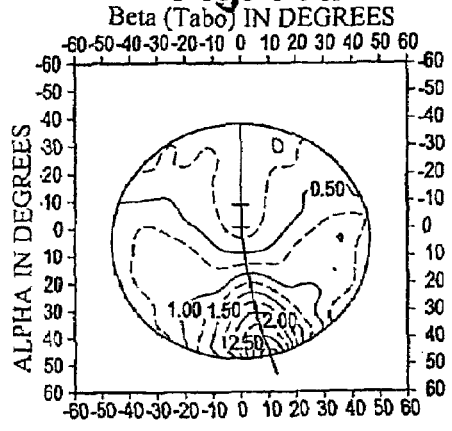
Figure 11E:
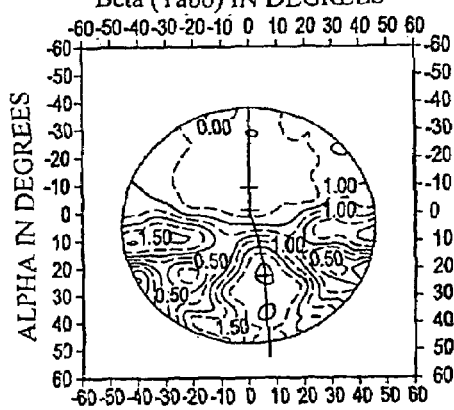
Figure 11F:
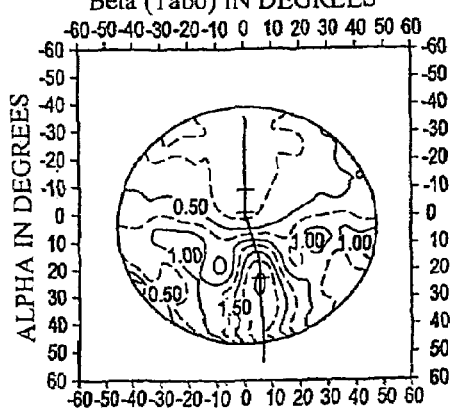

FIGS. 10a to 10f clearly show that the progression length PL varies according to the wearer. For wearers A and B, the prescribed addition is indeed achieved at −40° ocular elevation (FIGS. 10a and 10b) while the progression length is 32.5° for wearers C and D (FIGS. 10c and 10d) and 25° for wearers E and F (FIGS. 10e and 10f). Moreover, as wearers A, C, E and F have a near-vision vertical horopter close to 90°, the distance to the document varies very little when they lower their head and eyes to scan the document from top to bottom. The power required around the point NV therefore varies very little (FIGS. 10a, 10c, 10e and 10f). On the other hand, for wearers B and D who have a small near-vision vertical horopter value and far from 90°, reading the document from top to bottom results in a variation of the distance of the eyes from the document due to a lowering of the head. The power required for these wearers therefore increases below the point NV; from 0.04 diopter per degree on average between 40° and 50° for wearer B, reaching 2.4 diopters at 50° (FIG. 10b) and 0.06 diopter per degree between 32.50 and 48°, reaching 2.9 diopters at approximately 49° for wearer D (FIG. 10d).

The power variation along the meridian on the lenses obtained with the method of the invention is therefore controlled as a function of the lowering of the eyes and the distance from the object point aimed at, which depends on the value for the near-vision lowering of view V—or the near-vision vertical horopter measured on said wearer—and the participation of the eyes and/or the head of said wearer in the near-vision lowering of view. The power variation along the meridian for a lens personalized to the needs of a given wearer as proposed by the invention, therefore has a controlled and personalized progression length, as well as a controlled and personalized power variation below the near-vision reference point.

It will also be noted in FIGS. 11a to 11f that the optical power variation is approximately symmetrical with respect to the meridian, regardless of the meridian profile considered. Positional variations of this meridian can be noted in relation to the progression length and, for a given progression length, in relation to the near-vision vertical horopter of the wearer. These positional differences of the meridians of the different lenses given by way of example are particularly visible below the near-vision reference point NV (FIGS. 11b and 11d) due to the reduction of the distance of the eyes from the document caused by the lowering of the head in the case of a low-value near-vision vertical horopter.

Figure 12A:
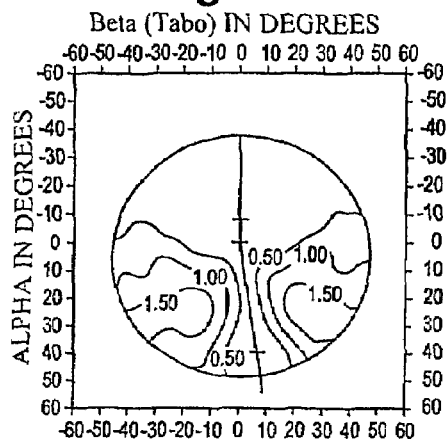
FIGS. 12*a* to 12*f*, resulting astigmatism maps for the lenses of FIGS. 10*a* to 10*f*.
Figure 12B:
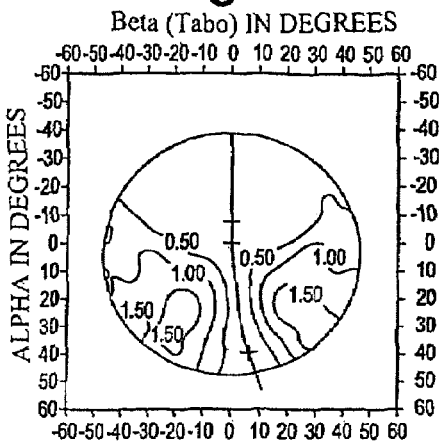
Figure 12C:
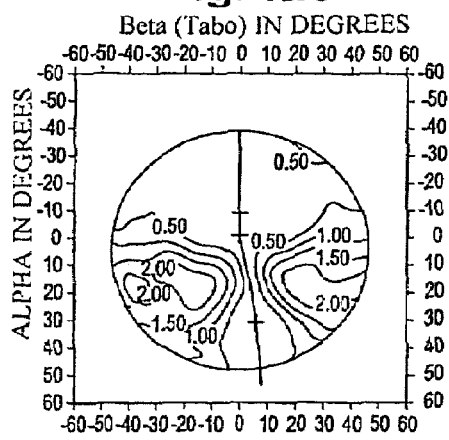
Figure 12D:
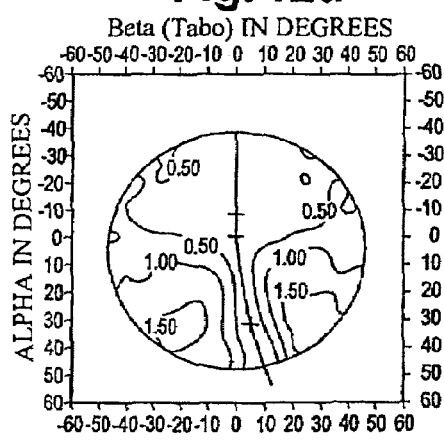
Figure 12E:
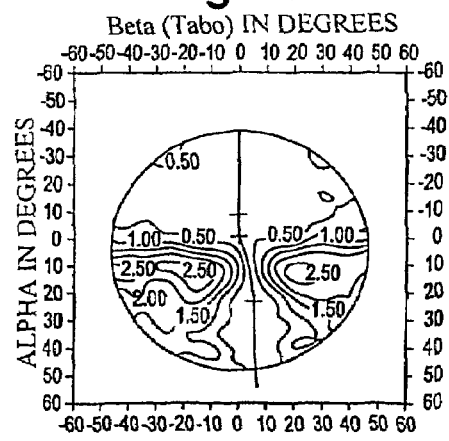
Figure 12F:
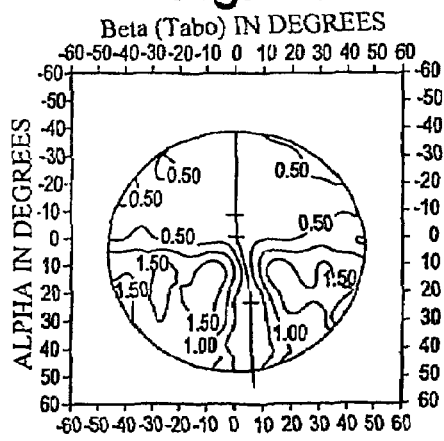

Moreover, the resulting astigmatism (FIGS. 12a to 12f) defines a near-vision corridor delimited by the isoastigmatism lines equal to 0.5 diopter, which increases in size in near vision together with a more gradual variation in the power along the meridian. Moreover, the smaller the coefficient of the horizontal participation of the head, the clearer are the near-vision fields (FIG. 12e compared to FIG. 12f) and the resulting maximum astigmatism is higher for shorter progression lengths where other coefficients are equal (FIG. 12c compared to FIG. 12e).

The physiological-optometry model used within the framework of the invention makes it possible to take into account all or some of the individual physiological parameters of the wearer and optionally to set the others to standard values by default. The wearer can thus maintain a more natural posture whilst retaining visual comfort.

It would also be possible for the model to take into account new personalization parameters identified subsequently.

The invention claimed is:

1. Method for determining by optimization a set of progressive ophthalmic lenses for a given wearer to whom a near-vision power addition ($Add_n$) has been prescribed, comprising the steps of:

measuring individual physiological parameters of the wearer in near-vision;

determining an ergorama associating, on each lens, a point aimed at for each direction of view under wearing conditions, determining a power defect target and a resulting astigmatism target for each direction of view under wearing conditions, the target power defect and the target resulting astigmatism being determined from the measured physiological parameters of the wearer;

calculating the power required on each lens for said ergorama by successive iterations to achieve the target power defect and the target astigmatism defect for each direction of view wherein the measured physiological parameters of the wearer include one or more of:

the vertical coefficient of participation of the head in near-vision, defined as the ratio of the elevation of the head to the lowering of view for a direction of view when the wearer aims at a near-vision target point;

the horizontal coefficient of participation of the head in near-vision, defined as the ratio of the orientation of the head in the horizontal plane to the orientation of view in this same plane when the wearer aims at a near-vision target point;

the vertical horopter in near-vision, defined as the angle formed by the direction of view with a document containing the point aimed at; and the preferred near-vision distance, defined as the distance between the eye and the document containing the point aimed at, and in which the power defect target is determined by the following relationship:

$$DefP = \frac{(ProbH') \cdot \left(\left(\frac{Add_n}{a}\right) - Add_r\right)}{kp}$$

with,

ProbH', the probability of occurrence of the orientation of view;

$Add_n$, the nominal prescribed addition for the wearer;

$Add_r$, the addition required at a point of the lens;

and kp and a, chosen coefficients setting the maximum power defect;

wherein, ProbH', the probability of occurrence of the orientation of view is determined by the following relationship:

$$ProbH' = 1e^{\frac{1}{2}\left(\frac{|\alpha|z}{\sigma h}\right)^2}$$

with,

α, the horizontal deviation of view in degrees for a given lowering;

z, a shaping factor comprised between 0.5 and 1 which depends on the measured horizontal coefficient of participation of the head in near-vision;

σh, a biphasic function of the vertical distribution of the ocular orientation and which is expressed as follows:

$$\sigma h = Sh\text{Max} \times Distrib \times \left( \frac{A\max_{FV}}{1+10^{((X0_{fv}-Elev_{oc})Hfv)}} + \frac{A\max_{NV}}{1+10^{((Elev_{oc}-X0_{nv})Hnv)}} \right)$$

where,
Distrib is a constant which depends on the prescribed nominal addition;
ShMax is a constant which depends on the prescribed addition and the measured horizontal coefficient of participation of the head in near-vision;
$A\max_{FV}$ and $A\max_{NV}$, the far-vision and near-vision upper asymptotes of $\sigma h$ respectively;
$H_{FV}$ and $H_{NV}$, the slopes of the variation of $\sigma h$ respectively when towards far vision and towards near vision;
$Elev_{OC}$, the vertical ocular elevation; and
$X0_{VL}$ et $X0_{VP}$, the ocular elevation for which half of $A\max_{FV}$ and $A\max_{NV}$ is respectively achieved on $\sigma h$.

2. The method of claim 1 in which the resulting astigmatism target is determined by the following relationship:

$$A = Ast_{MAX}(\text{ProbH})$$

with,
ProbH', the probability of occurrence of the orientation of view; and;

$$Ast_{MAX} = Add_n \times (k+b) \times \left(0.25 + e^{\frac{\left(ln\left(\frac{elev_{reg}-121}{-alpha0}\right)\right)^2}{sigma}}\right)$$

where
$Add_n$ is the nominal prescribed addition for the wearer; and
k, b, alpha0 and sigma, constants determined as a function of the physiological parameters of the wearer.

3. The method of claim 2 wherein, $k=((0.03 \cdot LP-1.075) \times Pth)+(1.717-0.027 \cdot LP)+((90-H) \times 0.05/32.5)$, with Pth being the measured horizontal coefficient of participation of the head in near-vision, H being the measured horopter and $LP=H \times (1-Ptv)$ with Ptv being the measured vertical coefficient of participation of the head in near-vision;

$$b = 0.5 - Pth;$$

alpha0$=25 \cdot Pth + (-5 \cdot Add_n) + H/2 + 0.7 \cdot LP + ((40-LP) \cdot (Pth-0.3) \cdot ((90-H)/32.5)) + 119.8$; and Sigma$=(0.05 \cdot Pth) + ((0.000714 \cdot H) \cdot (1+(LP-25)/62.5)) - 0.005$.

4. A set of progressive multifocal ophthalmic lenses personalized to the needs of a given wearer to whom a power addition has been prescribed, each lens being determined by means of an ergorama associating a point aimed at for each direction of view under wearing conditions, each lens having under wearing conditions, an optical power and a resulting astigmatism controlled for a point aimed at in the ergorama by physiological parameters of the wearer, wherein the physiological parameters of the wearer include one or more of:
the vertical coefficient of participation of the head in near-vision, defined as the ratio of the elevation of the head to the lowering of view for a direction of view when the wearer aims at a near-vision target point;
the horizontal coefficient of participation of the head in near-vision, defined as the ratio of the orientation of the head in the horizontal plane to the orientation of view in this same plane when the wearer aims at a near-vision target point;
the vertical horopter in near-vision, defined as the angle formed by the direction of view with a document containing the point aimed at; and
the preferred near-vision distance, defined as the distance between the eye and the document containing the point aimed at, and
in which the optical power, on each lens under wearing conditions for a point aimed at in the ergorama, is determined by the following relationship:

$$DefP = \frac{(ProbH') \cdot \left(\left(\frac{Add_n}{a}\right) - Add_r\right)}{kp}$$

with,
ProbH', the probability of occurrence of the orientation of view;
$Add_n$ the nominal prescribed addition for the wearer;
$Add_r$ the addition required at a point of the lens; and
kp and a, chosen coefficients setting the maximum power defect;
wherein, ProbH', the probability of occurrence of the orientation of view is determined by the following relationship:

$$ProbH' = 1e^{\frac{1}{2}\left(\frac{|a|Z}{\sigma h}\right)^2}$$

with,
α, the horizontal deviation of view in degrees for a given lowering;
z, a shaping factor comprised between 0.5 and 1 which depends on the measured horizontal coefficient of participation of the head in near-vision;
$\sigma h$, a biphasic function of the vertical distribution of the ocular orientation and which is expressed as follows:

$$\sigma h = Sh\text{Max} \times Distrib \times \left( \frac{A\max_{FV}}{1+10^{((X0_{fv}-Elev_{oc})Hfv)}} + \frac{A\max_{NV}}{1+10^{((Elev_{oc}-X0_{nv})Hnv)}} \right)$$

where,
Distrib is a constant which depends on the prescribed nominal addition;
ShMax is a constant which depends on the prescribed addition and the measured horizontal coefficient of participation of the head in near-vision;
$A\max_{FV}$ and $A\max_{NV}$, the far-vision and near-vision upper asymptotes of $\sigma h$ respectively;
$H_{FV}$ and $H_{NV}$, the slopes of the variation of $\sigma h$ respectively when towards far vision and towards near vision;
$Elev_{OC}$, the vertical ocular elevation; and
$X0_{VL}$ et $X0_{VP}$, the ocular elevation for which half of $A\max_{FV}$ and $A\max_{NV}$ is respectively achieved on $\sigma h$.

5. The set of lenses of claim 4, in which the resulting astigmatism, on each lens under wearing conditions for a point aimed at in the ergorama, is determined by the following relationship:

$$A = Ast_{MAX} \cdot (ProbH')$$

with,
ProbH', the probability of occurrence of the orientation of view; and;

$$Ast_{MAX} = Add_n \times (k+b) \times \left(0.25 + e^{\left(\ln\left(\frac{elev_{reg}-121}{-alpha0}\right)\right)^2 \over sigma}\right)$$

where $Add_n$ is the nominal prescribed addition for the wearer; and
k, b, alpha0 and sigma, constants determined in relation to the physiological parameters of the wearer.

6. The set of lenses of claim 5 wherein, k=((0.03·LP−1.075)×Pth)+(1.717−0.027·LP)+((90−H)×0.05/32.5), with Pth being the measured horizontal coefficient of participation of the head in near-vision, H being the measured horopter and LP=H×(1−Ptv) with Ptv being the measured vertical coefficient of participation of the head in near-vision;

b=0.5−Pth;

alpha0=25·Pth+(−5·Add$_n$)+H/2+0.7·LP+((40−LP)·(Pth−0.3)·((90−H)/32.5))+119.8; and Sigma=(0.05·Pth)+((0.000714·H)·(1+(LP−25)/62.5)−0.005.

7. A visual device comprising a set of progressive multifocal ophthalmic lenses personalized to the needs of a given wearer to whom a power addition has been prescribed, each lens being determined by means of an ergorama associating a point aimed at for each direction of view under wearing conditions, each lens having under wearing conditions, an optical power and a resulting astigmatism controlled for a point aimed at in the ergorama by physiological parameters of the wearer, wherein the physiological parameters of the wearer include one or more of:

the vertical coefficient of participation of the head in near-vision, defined as the ratio of the elevation of the head to the lowering of view for a direction of view when the wearer aims at a near-vision target point;
the horizontal coefficient of participation of the head in near-vision, defined as the ratio of the orientation of the head in the horizontal plane to the orientation of view in this same plane when the wearer aims at a near-vision target point;
the vertical horopter in near-vision, defined as the angle formed by the direction of view with a document containing the point aimed at; and
the preferred near-vision distance, defined as the distance between the eye and the document containing the point aimed at, and
in which the optical power, on each lens under wearing conditions for a point aimed at in the ergorama, is determined by the following relationship:

$$DefP = \frac{(ProbH')\left(\left(\frac{Add_n}{a}\right) - Add_r\right)}{kp}$$

with,
ProbH', the probability of occurrence of the orientation of view;
$Add_n$, the nominal prescribed addition for the wearer;
$Add_r$, the addition required at a point of the lens; and kp and a, chosen coefficients setting the maximum power defect;
wherein, ProbH', the probability of occurrence of the orientation of view is determined by the following relationship:

$$ProbH' = 1 e^{\frac{1}{2}\left(\frac{|\alpha|^Z}{\sigma h}\right)^2}$$

with,
α, the horizontal deviation of view in degrees for a given lowering;
z, a shaping factor comprised between 0.5 and 1 which depends on the measured horizontal coefficient of participation of the head in near-vision;
σh, a biphasic function of the vertical distribution of the ocular orientation and which is expressed as follows:

$$\sigma h = ShMax \times Distrib \times \left(\frac{Amax_{FV}}{1+10^{((X0_{fv}-Elev_{OC})Hfv)}} + \frac{A\ max_{NV}}{1+10^{((Elev_{OC}-X0_{nv})Hnv)}}\right)$$

where,
Distrib is a constant which depends on the prescribed nominal addition;
ShMax is a constant which depends on the prescribed addition and the measured horizontal coefficient of participation of the head in near-vision;
$Amax_{FV}$ and $Amax_{NV}$, the far-vision and near-vision upper asymptotes of σh respectively;
$H_{FV}$ and $H_{NV}$, the slopes of the variation of σh respectively when towards far vision and towards near vision;
$Elev_{OC}$, the vertical ocular elevation; and
$X0_{VL}$ and $X0_{VP}$, the ocular elevation for which half of $Amax_{FV}$ and $Amax_{NV}$ is respectively achieved on σh.

8. The visual device of claim 7, in which the resulting astigmatism, on each lens under wearing conditions for a point aimed at in the ergorama, is determined by the following relationship:

$$A = Ast_{MAX} \cdot (ProbH')$$

with,
ProbH', the probability of occurrence of the orientation of view; And;

$$Ast_{MAX} = Add_n \times (k+b) \times \left(0.25 + e^{\left(\ln\left(\frac{elev_{reg}-121}{-alpha0}\right)\right)^2 \over sigma}\right)$$

where $Add_n$ is the nominal prescribed addition for the wearer; and
k, b, alpha0 and sigma, constants determined in relation to the physiological parameters of the wearer.

9. The visual device of claim 8 wherein, k=((0.03·LP−1.075)×Pth)+(1.717−0.027·LP)+((90−H)×0.05/32.5), with Pth being the measured horizontal coefficient of participation of the head in near-vision, H being the measured horopter and LP=H×(1−Ptv) with Ptv being the measured vertical coefficient of participation of the head in near-vision;

b=0.5−Pth;

$$\text{alpha0} = 25 \cdot Pth + (-5 \cdot \text{Add}_n) + H/2 + 0.7 \cdot LP + ((40 - LP) \cdot (Pth - 0.3) \cdot ((90 - H)/32.5)) + 119.8; \text{ and}$$

$$\text{Sigma} = (0.05 \cdot Pth) + ((0.000714 \cdot H) \cdot (1 + (LP - 25)/62.5) - 0.005.$$

* * * * *

UNITED STATES PATENT AND TRADEMARK OFFICE
CERTIFICATE OF CORRECTION

PATENT NO.         : 7,997,726 B2
APPLICATION NO.    : 12/097238
DATED              : August 16, 2011
INVENTOR(S)        : Drobe et al.

It is certified that error appears in the above-identified patent and that said Letters Patent is hereby corrected as shown below:

First Page Column 1    (73) Assignee    Delete "d'Optique)," and insert -- D'Optique), --, therefor.

Column 6    Line 47    Delete "oil" and insert -- on --, therefor.

Column 9    Line 20    Delete "cars" and insert -- ears --, therefor.

Column 12    Line 13    Delete "Guassian" and insert -- Gaussian --, therefor.

Column 12    Line 67    Delete "Pospine" and insert -- Pospinc --, therefor.

Column 17    Line 14    Delete "10c and 10f)." and insert -- 10e and 10f). --, therefor.

Column 17    Line 22    Delete "32.50" and insert -- 32.5° --, therefor.

Column 18    Line 56    In Claim 1, delete " $\mathrm{Pr}\,obH' = 1e^{\frac{1}{2}\left(\frac{|\alpha|^2}{\sigma h}\right)^2}$ " and insert -- $\mathrm{Pr}\,obH' = 1 - e^{\frac{1}{2}\left(\frac{|\alpha|^2}{\sigma h}\right)^2}$ --, therefor.

Column 19    Line 20    In Claim 1, delete "et" and insert -- and --, therefor.

Column 19    Line 25    In Claim 2, delete "(ProbH)" and insert -- (ProbH') --, therefor.

Signed and Sealed this
Twenty-ninth Day of May, 2012

David J. Kappos
*Director of the United States Patent and Trademark Office*

CERTIFICATE OF CORRECTION (continued)
U.S. Pat. No. 7,997,726 B2

| Column 20 | Line 32 | In Claim 4, delete " $ProbH' = 1e^{\frac{1}{2}\left(\frac{|\alpha|^2}{\sigma h}\right)^2}$ " and insert -- $ProbH' = 1 - e^{\frac{1}{2}\left(\frac{|\alpha|^2}{\sigma h}\right)^2}$ --, therefor. |
|---|---|---|
| Column 20 | Line 62 | In Claim 4, delete "et" and insert -- and --, therefor. |
| Column 22 | Line 7 | In Claim 7, delete " $ProbH' = 1e^{\frac{1}{2}\left(\frac{|\alpha|^2}{\sigma h}\right)^2}$ " and insert -- $ProbH' = 1 - e^{\frac{1}{2}\left(\frac{|\alpha|^2}{\sigma h}\right)^2}$ --, therefor. |
| Column 22 | Line 49 (Approx.) | In Claim 8, delete "And;" and insert -- and; --, therefor. |